United States Patent [19]
Namiki et al.

[11] Patent Number: 5,726,231
[45] Date of Patent: Mar. 10, 1998

[54] FLAME RETARDANT POLYOLEFIN COMPOUND HAVING LOW SMOKING AND TOXICITY

[75] Inventors: Yukihiko Namiki, Kawasaki; Yasushi Kato, Nara; Misao Hanai, Yokohama; Yasunori Kitano; Hirofumi Kurisu, both of Ako, all of Japan

[73] Assignee: Tateho Chemical Industries Co., Ltd., Ako, Japan

[21] Appl. No.: 660,446

[22] Filed: Jun. 7, 1996

[51] Int. Cl.$^6$ .................................................. C08K 3/22
[52] U.S. Cl. ........................ 524/413; 524/434; 524/436
[58] Field of Search .................................. 524/436, 434, 524/413

[56] References Cited

U.S. PATENT DOCUMENTS

| | | | |
|---|---|---|---|
| 3,810,861 | 5/1974 | Tacke et al. | 524/434 |
| 3,829,400 | 8/1974 | Kato et al. | 524/434 |
| 3,859,390 | 1/1975 | Tsuji et al. | 524/434 |
| 4,041,144 | 8/1977 | Obara et al. | 524/436 |
| 4,439,572 | 3/1984 | Kindrick | 524/434 |
| 4,618,469 | 10/1986 | Ogawa et al. | 524/434 |
| 5,278,218 | 1/1994 | Carette | 524/434 |
| 5,342,874 | 8/1994 | Chaplin et al. | 524/436 |
| 5,344,636 | 9/1994 | Miyata | 524/436 |

FOREIGN PATENT DOCUMENTS

| | | |
|---|---|---|
| 3503998 | 8/1986 | Germany . |
| 59-204916 | 11/1984 | Japan . |
| 5-112669 | 5/1993 | Japan . |

*Primary Examiner*—Veronica P. Hoke
*Attorney, Agent, or Firm*—Oblon, Spivak, McClelland, Maier & Neustadt, P.C.

[57] ABSTRACT

A flame retardant polyolefin compound having low smoking and toxicity comprising 100 parts by weight of polyolefin resin, 100 to 150 parts by weight of a flame retardant, and 2 to 10 parts by weight of zinc stannate as a flame retardant auxilliary agent. The flame retardant polyolefin compound preferably uses a composite metal hydroxide as the flame retardant.

6 Claims, No Drawings

FLAME RETARDANT POLYOLEFIN COMPOUND HAVING LOW SMOKING AND TOXICITY

BACKGROUND OF THE INVENTION

1. Field of the Invention

The invention relates to a polyolefin compound having low smoking and toxicity, and particularly to a flame retardant material having low smoking and toxicity to be used as an electric wire and cable covering material or a component material consisting a wall paper.

2. Description of the Related Art

Since polyolefin resins are generally flexible, excellent in electrical insulating properties, and cheaper than other materials, they have been used extensively as electric wire covering material and wall paper component material, and particularly used in a large quantity as the electric wire covering material. But, because of the past serious fires when used as the electric wire covering material, demands for flame-retarding are increasing, and nuclear cable material and other various types of flame retardant cable materials have been developed and actually used. Such cables, however, produce a large quantity of smoke in case of fire, and make it difficult to evacuate or extinguish the fire when the fire is in a closed space such as an underground shopping center, a subway, or a ship, possibly causing a secondary accident. Therefore, it is demanded to develop a low-smoking material which smokes much less in case of fire. In addition to the flame-retarding, it is also demanded to reduce toxic gas such as carbon monoxide from being produced when burning.

Generally, high molecular materials burn when thermally decomposed gas reacts with oxygen, and if the heat of combustion at this time is sufficient, it further causes another combustible material to decompose thermally. And, this cycle is continuously repeated. In other words, the continuous burning of the material needs three factors; (1) presence of combustible material, (2) supply of oxygen, and (3) keeping of a temperature (thermal energy). Lack of at least one of these three factors results in stopping combustion.

Among the polyolefin resins, polyethylene, polypropylene and their copolymers such as an ethylene-vinyl acetate copolymer (hereinafter referred to as the EVA resin) and an ethylene-ethyl acrylate copolymer (hereinafter referred to as the EEA resin) have been used extensively as molding materials, film materials and others. And, as the electric wire covering material, they have good electrical and mechanical properties and good processability and are extensively used as insulating and sheathing materials. However, the polymers represented by such polyethylene and its copolymers are intrinsically flammable because of their chemical structures. And, to make such resins flame retardant, it is required to add a large quantity of a flame retardant as its auxilliary agent and the like, e.g., at least 180 parts by weight of a flame retardant against 100 parts by weight of such a resin. Besides, the flame retardant compounds are poor in mechanical properties and processing characteristics. Thus, they have many disadvantages in view of practical application.

On the other hand, polyvinyl chloride resin is also used extensively as an electric wire and cable covering material and a component material of wall paper. This polyvinyl chloride resin contains chlorine and is intrinsically flame retardant. Therefore, it is extensively used as the electric wire covering material and wall paper material. Specifically, this polyvinyl chloride resin has its flame retardant improved by adding in combination a substance for stopping a radical reaction (a halogen-based additive etc.), a substance for interrupting the supply of oxygen (e.g., bromine-based flame retardants represented by halogen-based, nitrogen-based and phosphorous-based flame retardants), and a substance for absorbing heat in order to decrease a temperature (an aluminum hydroxide, a magnesium hydroxide, zinc borate, etc.). In particular, as a conventionally used flame retardant, the halogen-based flame retardant has been used extensively in combination with antimony trioxide. But, the flame retardant having the above combination is partly decomposed in its production process and produces halogen gas which corrodes the processing and molding machines and is toxic to workers. And, it also has a disadvantage of producing a large quantity of smoke including HCl gas and toxic gas in case of fire. Therefore, electric wire and cable covering materials and wall paper materials, which are produced and used safely have been strongly required to be developed.

To solve the aforementioned disadvantages, it has been demanded to develop a flame retardant material having excellent mechanical properties which mainly includes the above halogen-free polyolefin-based resin and does not produce HCl gas.

SUMMARY OF THE INVENTION

The invention has been completed in view of the above problems, and aims to provide a flame retardant polyolefin compound suitable as the electric wire covering material and wall paper material having improved mechanical properties and flame retardant properties by reducing the addition of the flame retardant material, particularly a hydroxide as low as possible from the halogen-free polyolefin-based resin material.

A flame retardant polyolefin compound having low smoking and toxicity according to the invention comprises 100 parts by weight of polyolefin resin and 100 to 150 parts by weight of a flame retardant, characterized in that the above compound contains 2 to 10 parts by weight of zinc stannate as a flame retardant auxilliary agent.

In the above polyolefin compound, the flame retardant can be various types of metal hydroxides such as an aluminum hydroxide, a magnesium hydroxide, a mixture thereof, and a composite metal hydroxide; and the composite metal hydroxide is particularly preferable because it is provided with functions of flame retardant by absorbing heat when water is produced by the decomposition of the composite metal hydroxide during combustion and by an effect of catalyzing to accelerate carbonization of the metal in the composite metal hydroxide. This composite metal hydroxide includes a composite metal hydroxide having a chemical composition expressed by $Mg_{1-x}M^{+2}_{x}(OH)_2$, in which $M^{+2}$ is at least one selected from a group of divalent metallic ions $Mn^{+2}, Fe^{+2}, Co^{+2}, Ni^{+2}, Cu^{+2}$ and $Zn^{+2}$, and x is a numerical value satisfying $0.001 \leq X \leq 0.9$.

As the above polyolefin resin, polyethylene, polypropylene, and their copolymers are used, and among such copolymers, an ethylene-acrylate copolymer is particularly preferable in view of processability and mechanical properties.

Zinc stannate as the above flame retardant auxilliary agent is expressed by $ZnSnO_3$ and thermally decomposed at a high temperature as expressed by the following formula.

$$ZnSnO_3 \rightarrow Zn_2SnO_4 + SnO_2 (580° \text{ to } 800° \text{ C.})$$

It was found that when the above-described zinc stannate is added to polyvinyl chloride resin, the quantity and reaction rate of smoke and CO produced from the resin is greatly decreased as compared with antimony trioxide used conventionally. In this mechanism, zinc contained in the chemical formula serves as a catalyst for the dehydrohalogenation reaction of the resin in order to accelerate the formation of a carbonized layer and to suppress the production of smoke, and an endothermic reaction owing to the volatilization of water content involved in the thermal decomposition lowers a combustion temperature. Besides, it is conceived that the gas phase flame retardant effect owing to partial volatilization of zinc (Zn) and tin (Sn) at 550° C. or more is effective to reduce CO, and remarkable effects can be obtained by synergism between a condensed layer by the carbonized layer formation and the flame retardant effect in the gas phase provided by the volatile flame retardant gas. But, this cannot be entirely applied to a halogen-free resin, namely a non-halogen-based resin, and its effects were not expected at all.

The inventors have made a devoted study and found that the above-described effects can be obtained by the non-halogen-based resin when zinc stannate is combined with a metal hydroxide-based flame retardant.

This zinc stannate is used in combination with an inorganic flame retardant such as metal hydroxides. Specifically, when the metal hydroxides represented by an aluminum hydroxide and a magnesium hydroxide or a mixture of such metal hydroxides and a composite metal hydroxide are used in combination, an oxygen index can be improved without lowering physical properties and a burning rate in the burning test can be decreased. Besides, addition of a small quantity of zinc stannate can considerably decrease the addition of the above metal hydroxide, enabling to attain the required flame retardant properties by using a small quantity of metal hydroxide. Thus, the compound can be improved in physical properties, namely mechanical and electrical properties.

When burning, the metal hydroxide can lower a temperature by releasing water and absorbing heat. The metal hydroxide is added in an amount ranging from 80 to 150 parts by weight against 100 parts by weight of the resin. When it is less than 80 parts by weight, a flame retardant effect cannot be expected very well, and when it exceeds 150 parts by weight, the processability of the compound and the mechanical properties of a product are lowered heavily. More preferably, the metal hydroxide is added in a range of 100 to 140 parts by weight.

The quantity of zinc stannate in the flame retardant polyolefin compound according to the invention is in a range of 2 to 10 parts by weight against 100 parts by weight of the resin. When it is less than 2 parts by weight, a sufficient flame retardant effect cannot be obtained, and when it exceeds 10 parts by weight, the dynamic thermal stability required in producing the compound and processing electric wire covering cannot be obtained, and general physical properties after processing become inferior. Preferably, the quantity of zinc stannate is in a range of 2 to 5 parts by weight.

When zinc stannate is used together with a metal hydroxide as a flame retardant with respect to the polyolefin-based resin, the flame retardant properties during the burning of the polyolefin-based compound can be improved considerably, enabling to attain low smoking and toxicity. Besides, the processability of the compound and the mechanical and electrical properties after processing can also be improved.

DESCRIPTION OF THE PREFERRED EMBODIMENTS

The invention will be described in detail with reference to examples.

EXAMPLES 1 to 4

To 100 parts by weight of EEA having a melt index of 1.2 and ethyl acrylate content of 15 mol %; 0.2 part by weight of an antioxidant; and a composite metal hydroxide as a flame retardant expressed by a chemical formula $Mg_{1-x}M^{+2}{}_xX(OH)_2$, in which $M^{+2}$ is at least one selected from a group of divalent metallic ions $Mn^{+2}$, $Fe^{+2}$, $Co^{+2}$, $Ni^{+2}$, $Cu^{+2}$ and $Zn^{+2}$, and x is a numerical value satisfying $0.001 \leq X \leq 0.9$; zinc stannate as a flame retardant auxilliary agent; and carbon as a coloring agent for providing weatherability were added in the amounts shown in Table 1 to prepare test compositions.

COMPARATIVE EXAMPLES 1 to 4

As comparative samples, in the same way as in Examples 1 to 4, sample compositions containing the same amounts of the components as shown in Table 1 were prepared excepting that zinc stannate as a flame retardant auxilliary agent was not added.

These compositions were mixed in a blender, kneaded by two rolls, and press-molded to prepare sheet test samples.

The sheet samples were measured for an oxygen index according to the oxygen index method of JIS K 7201, a tensile strength, elongation and volume resistivity.

Using these compounds as a sheathing material, 600V crosslinked polyethylene insulated cables were prepared and subjected to the vertical tray combustion test according to JIS C 3521. They had two sizes, one 3.5 mm² and the other 14 mm². Two cables were tested for each size.

Table 2 shows the test results.

TABLE 1

| Component material | Examples | | | | Comparative Examples | | | |
|---|---|---|---|---|---|---|---|---|
| | 1 | 2 | 3 | 4 | 1 | 2 | 3 | 4 |
| EEA resin | 100 | 100 | 100 | 100 | 100 | 100 | 100 | 100 |
| Flame retardant $Mg_{1-x}M^{+2}{}_x(OH)_2$ | 115 | 130 | 140 | 140 | 115 | 130 | 140 | 150 |
| Zinc stannate | 3 | 3 | 3 | 0 | 0 | 0 | 0 | 0 |
| Carbon | 0 | 0 | 0 | 6.25 | 2.6 | 0 | 0 | 0 |

TABLE 2

| Test items | Examples | | | | Comparative Examples | | | |
|---|---|---|---|---|---|---|---|---|
| | 1 | 2 | 3 | 4 | 1 | 2 | 3 | 4 |
| Oxygen index | 28.5 | 29.0 | 30.0 | 34.3 | 28.0 | 28.3 | 29.0 | 30.5 |
| Tensile strength (kg/mm$^2$) | 1.11 | 1.01 | 1.00 | 0.98 | 1.15 | 1.07 | 0.92 | 0.79 |
| Elongation (%) | 651 | 631 | 625 | 620 | 679 | 667 | 607 | 591 |
| Volume resistivity $\rho$ ($\Omega$-cm) | $1.8 \times 10^{15}$ | $1.6 \times 10^{15}$ | $1.3 \times 10^{14}$ | $6.2 \times 10^{14}$ | $8.2 \times 10^{15}$ | $4.4 \times 10^{15}$ | $4.0 \times 10^{15}$ | $2.8 \times 10^{15}$ |
| Vertical tray test Burnt carbonized distance (cm) | | | | | | | | |
| 3.5 mm$^2$ | | 110 | | 94 | Burned out | Burned out | 94 | |
| | | 180 | | 105 | Burned out | 182 | 117 | |
| 14 mm$^2$ | | 128 | | 84 | Burned out | Burned out | 121 | |
| | | 143 | | 115 | 143 | 152 | 142 | |

It is seen from Table 2 that when zinc stannate is added as the flame retarding assistant to the composite metal hydroxide as the flame retarder of the Invention, flame resistance is remarkably improved. Specifically, when the composite metal hydroxide alone is used, passing the vertical tray test needs it in an amount of 150 parts by weight against 100 parts by weight of polyolefin resin. But, the present invention can provide the same level of flame retardant properties by adding 3 parts by weight of zinc stannate even when the composite metal hydroxide is 130 parts by weight. This is resulted from further acceleration of dehydrogenation-carbonization of the resin during combustion owing to the multiplier effect of the catalytic effects of the composite metal hydroxide and zinc stannate. And, a mechanical strength is also improved greatly. Besides, the volume resistivity is kept at a high level of x$10^{15}$.

When Sample 2 and Comparative Sample 2 are compared for the vertical tray test, it is apparent that the addition of zinc stannate as the auxilliary agent lowers a burning rate.

EXAMPLES 5 to 8

In Examples 5 to 8, to prepare test compositions, the same EEA resin was used, 130 parts by weight of a magnesium hydroxide having as the main component Mg(OH)$_2$ was used instead of the composite metal hydroxide expressed by a chemical formula Mg$_{1-x}$M$^{+2}_x$(OH)$_2$ used in Examples 1 and 4, 130 parts by weight of the composite metal hydroxide expressed by a chemical formula Mg$_{1-x}$M$^{+2}_x$(OH)$_2$ as used as the flame retardant, and zinc stannate was used in various amounts as shown in Table 3. Tests were made in the same way as in Examples 1 to 4.

COMPARATIVE EXAMPLES 5 to 6

In Comparative Examples 5 to 6, compositions prepared by using 130 parts by weight of a composite metal hydroxide expressed by a chemical formula Mg$_{1-x}$M$^{+2}_x$(OH)$_2$ as a flame retardant, and zinc stannate in various amounts as shown in Table 3 not within the range specified by the invention were tested. But, when 15 parts by weight of zinc stannate was used, it was quite difficult to produce an electric wire covering. The test methods were the same as in Examples 5 to 8.

Table 4 shows the test results. Specifically, when Mg(OH)$_2$ was used as the flame retardant, flame retardant properties were found to be improved slightly, but it was not a noticeable effect unlike the case of using the composite metal hydroxide expressed by a chemical formula Mg$_{1-x}$M$^+_{2x}$(OH)$_2$. And, volume resistivity was at a low level of $5.3 \times 10^{13}$.

When zinc stannate is added in an amount below the range specified by the invention, flame retardant properties are not improved satisfactorily, and when it exceeds the specified range, the flame retardant properties are not improved either. Besides, mechanical properties are too poor to be used practically.

TABLE 3

| | Examples | | | | Comparative Examples | |
|---|---|---|---|---|---|---|
| Component material | 5 | 6 | 7 | 8 | 5 | 6 |
| EEA resin | 100 | 100 | 100 | 100 | 100 | 100 |
| Flame retardant | | | | | | |
| Mg$_{1-x}$M$^{+2}_x$(OH)$_2$ | | 130 | 130 | 130 | 130 | 130 |
| Mg(OH)$_2$ | 130 | | | | | |
| Zinc stannate | 3 | 2 | 5 | 10 | 1 | 15 |

TABLE 4

| | Examples | | | | Comparative Examples | |
|---|---|---|---|---|---|---|
| Test items | 5 | 6 | 7 | 8 | 5 | 6 |
| Oxygen index | 30.2 | 29.5 | 31.5 | 34.0 | 28.8 | 37.0 |
| Tensile strength (kg/mm$^2$) | 1.00 | 1.03 | 1.01 | 1.00 | 1.05 | 0.98 |
| Elongation (%) | 622 | 660 | 650 | 640 | 665 | 630 |
| Volume resistivity $\rho$($\Omega$-cm) | $5.3 \times 10^{13}$ | $3.5 \times 10^{15}$ | $3.0 \times 10^{15}$ | $2.1 \times 10^{15}$ | $4.0 \times 10^{15}$ | $1.5 \times 10^{15}$ |
| Vertical tray test Burnt carbonized distance (cm) | | | | | | |
| 3.5 mm$^2$ | Burned | Burned | 120 | 110 | Burned | 110 |

TABLE 4-continued

| | Examples | | | | Comparative Examples | |
|---|---|---|---|---|---|---|
| Test items | 5 | 6 | 7 | 8 | 5 | 6 |
| 14 mm² | Burned out | 170 | 160 | 100 | Burned out | 120 |
| | 159 | 160 | 118 | 84 | Burned out | 100 |
| | 144 | 173 | 130 | 110 | 175 | 130 |

EXAMPLES 9 to 11

As a test sample, low-density polyethylene (hereinafter referred to as the VLDPE) was used, and the tests were conducted in the same way as the EEA resin was used. To 100 parts by weight of VLDPE containing 0.2 part by weight of an antioxidant, composite metal hydroxides expressed by chemical formulas $Mg_{1-x}M^{+2}_{x}(OH)_2$ and $Mg(OH)_2$ were added as the flame retardant in the amounts shown in Table 5, and 3 parts by weight of zinc stannate was added as the flame retardant auxilliary agent. They were mixed in a blender, kneaded by two roll mill, and press-molded into a sheet. Thus, sheet test samples were prepared. The samples were measured for a tensile strength and elongation. Besides, they were measured for burning characteristics according to UL-94VE.

COMPARATIVE EXAMPLES 7 to 8

To prepare comparative samples, the procedures of Examples 9 to 11 were followed excepting that 150 parts by weight of composite metal hydroxides expressed by chemical formulas $Mg_{1-x}M^{+2}_{x}(OH)_2$ and $Mg(OH)_2$ were added as the flame retardant and zinc stannate was not added as the flame retardant auxilliary agent.

Table 6 shows the test results of Examples 9 to 11 and Comparative Examples 7 to 8.

It was found that Examples 9 to 11 passed the burning test according to UL-94VE regardless of the fact that the amount of the flame retardant was smaller than Comparative Examples 7 and 8 in the same way as when the EEA resin was used.

On the other hand, in Comparative Examples 7 and 8 which do not add zinc stannate as the flame retardant auxilliary agent, it was found that mechanical properties were noticeably lowered even when 150 parts by weight of composite metal hydroxides expressed by chemical formulas $Mg_{1-x}M^{+2}_{x}(OH)_2$ and $Mg(OH)_2$ were added as the flame retardant so as to pass the burning test.

TABLE 5

| | Examples | | | Comparative Examples | |
|---|---|---|---|---|---|
| Component material | 9 | 10 | 11 | 7 | 8 |
| VLDPE resin | 100 | 100 | 100 | 100 | 100 |
| Flame retardant | | | | | |
| $Mg_{1-x}M^{+2}_{x}(OH)_2$ | 130 | 140 | | | 150 |
| $Mg(OH)_2$ | | | 130 | 150 | |
| Zinc stannate | 3 | 3 | 3 | | |

TABLE 6

| | Examples | | | Comparative Examples | |
|---|---|---|---|---|---|
| | 9 | 10 | 11 | 7 | 8 |
| Burning test (UL-94VE) | V-0 | V-0 | Not Pass V-0, V-1, V-2 | V-0 | V-0 |
| Tensile strength (kg/mm²) | 1.01 | 0.95 | 1.00 | 0.88 | 0.82 |
| Elongation (%) | 653 | 632 | 655 | 602 | 593 |

As described above, in order to pass the burning test according to UL-94VE, to 100 parts by weight of polyolefin resin, $Mg(OH)_2$ and a composite metal hydroxide are each required to be added in 150 parts by weight. But, this invention adds 3 parts by weight of zinc stannate to enable the reduction of the flame retardant to be added substantially. Accordingly, a mechanical strength is improved greatly.

Especially, when the composite metal hydroxide is used as the flame retarder and zinc stannate is used as the flame retarding assistant, the volume resistivity is not lowered, indicating better flame retardant properties than when $Mg(OH)_2$ and zinc stannate are used. And, it was found that use of the composite metal hydroxide and zinc stannate has an efficient effect on flame retardant properties and other properties.

Addition of the metal hydroxide as the flame retardant and zinc stannate as the flame retarding auxilliary agent to the polyolefin resin not containing halogen delays an ignition time and can achieve low smoking and toxicity. At the same time, the quantity of metal hydroxide is decreased greatly, and the mechanical properties involved in the addition of a large quantity of hydroxide can be prevented from being lowered greatly.

What is claimed is:

1. A flame retardant polyolefin compound having low smoking and toxicity, comprising 100 parts by weight of a halogen-free polyolefin resin, 80 to 150 parts by weight of a flame retardant hydroxide of one or more metals, and 2 to 10 parts by weight of zinc stannate as a flame retardant auxilliary agent.

2. The polyolefin compound according to claim 1, wherein said flame retardant is a composite metal hydroxide.

3. The polyolefin compound according to claim 1, wherein said flame retarder is a composite metal hydroxide expressed by a chemical formula $Mg_{1-x}M^{+2}_{x}(OH)_2$, in which $M^{+2}$ is at least one selected from a group of divalent metallic ions $Mn^{+2}$, $Fe^{+2}$, $Co^{+2}$, $Ni^{+2}$, $Cu^{+2}$ and $Zn^{+2}$, and x is a numerical value satisfying $0.001 \leq X \leq 0.9$.

4. The polyolefin compound according to claim 1, wherein said polyolefin resin is at least one member selected from the group consisting of polyethylene, polypropylene, an ethylene-ethyl acrylate copolymer, and an ethylene-vinyl acetate copolymer.

5. The polyolefin compound according to claim 4, wherein said compound further contains less than 3 parts by weight of carbon.

6. The polyolefin compound according to claim 1, 2, 3, 4 or 5, wherein said compound has an oxygen index of at least 26.

* * * * *

UNITED STATES PATENT AND TRADEMARK OFFICE
CERTIFICATE OF CORRECTION

PATENT NO. : 5,726,231
DATED : MARCH 10, 1998
INVENTOR(S) : Yukihiko NAMIKI et al It is certified that error appears in the above-identified patent and that said Letters Patent is hereby corrected as shown below:

Column 4, lines 25 & 26, "$Mg_{1-x}M^{+2}{}_xX(OH)_2$" should read --$Mg_{1-x}M^{+2}{}_x(OH)_2$--.

Signed and Sealed this

Twenty-seventh Day of October, 1998

Attest:

BRUCE LEHMAN

*Attesting Officer*  *Commissioner of Patents and Trademarks*